(12) United States Patent
Croak et al.

(10) Patent No.: US 8,798,258 B1
(45) Date of Patent: Aug. 5, 2014

(54) METHOD AND APPARATUS FOR PROVIDING TELECOMMUTING VIRTUAL NUMBERS FOR REMOTE WORKERS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1445 days.

(21) Appl. No.: 11/240,946

(22) Filed: Sep. 30, 2005

(51) Int. Cl.
*H04M 3/00* (2006.01)
*H04M 3/42* (2006.01)

(52) U.S. Cl.
USPC ............. 379/266.09; 379/207.14; 379/207.15

(58) Field of Classification Search
CPC ............ H04M 3/5183; H04M 3/5125; H04M 3/42042; H04M 3/42059; H04M 15/06; H04M 1/57; H04M 2242/22

USPC .............. 379/266.09, 142.06, 207.14–207.15
See application file for complete search history.

(56) References Cited

U.S. PATENT DOCUMENTS

| | | | |
|---|---|---|---|
| 5,450,618 A * | 9/1995 | Naddell et al. ............. | 455/553.1 |
| 5,889,845 A * | 3/1999 | Staples et al. ............. | 379/211.02 |
| 5,901,209 A * | 5/1999 | Tannenbaum et al. ... | 379/142.09 |
| 6,327,353 B1 * | 12/2001 | Fukuzawa et al. ....... | 379/201.01 |
| 7,496,360 B2 * | 2/2009 | Sindhwani et al. ........ | 455/422.1 |
| 2002/0044638 A1 * | 4/2002 | Gruchala et al. .......... | 379/207.02 |
| 2003/0198326 A1 * | 10/2003 | Wei .......................... | 379/142.14 |
| 2005/0249196 A1 * | 11/2005 | Ansari et al. .................. | 370/352 |

* cited by examiner

Primary Examiner — Rasha Al Aubaidi (57) ABSTRACT

A method and apparatus for providing enterprises with the ability to provide telecommuting virtual number to these remote workers that are consistent with the dialing plans used internally at an enterprise location are disclosed. This telecommuting virtual number is routed through a packet network, e.g., a VoIP network, to allow calls placed to and from these workers to be treated as local calls.

3 Claims, 6 Drawing Sheets

METHOD AND APPARATUS FOR PROVIDING TELECOMMUTING VIRTUAL NUMBERS FOR REMOTE WORKERS

The present invention relates generally to communication networks and, more particularly, to a method and apparatus for enabling telecommuting virtual numbers for remote workers in a communication network, e.g., a packet network such as a Voice over Internet Protocol (VoIP) network.

BACKGROUND OF THE INVENTION

Enterprises support an increasing number of telecommuters who work from home or other remote locations. A telecommuter is an employee who works remotely from the centrally located work location using voice and data connectivity to access centrally located resources of the company. Enterprises desire these workers to remain connected to the more centrally located work forces they employ and the actual locations where these telecommuters work from to be relatively transparent. Calls to and from these remote workers at remote locations can often interfere with this transparency since they are typically outside of the immediate local calling area of the enterprise. For instance, when a remote worker working at home calls a colleague at the headquarter, the calling party identification (ID) will show the remote worker's home phone number which typically does not have the same NPA and NXX as those of the headquarter. On the other hand, when an employee from the headquarter calls a remote worker working at the home phone number, the call is typically made to a location outside of the local calling area of the headquarter location. In addition, the call will typically be a long distance call from a billing and cost perspective.

Therefore, a need exists for a method and apparatus for providing telecommuting virtual numbers for remote workers in a packet network, e.g., a VoIP network.

SUMMARY OF THE INVENTION

In one embodiment, the present invention enables enterprises the ability to provide telecommuting virtual number to the remote workers that are consistent with the NPA and the NXX of the dialing plans used internally at their headquarter location. For example, if the enterprise has an NPA of 212 and an NXX of 555, then the enterprise can provide a virtual number to each of the remote workers with the same NPA and NXX.

In one embodiment, this telecommuting virtual number is routed through a packet network, e.g., a VoIP network allowing calls placed to and from these workers to be treated as local calls. The remote workers will call their assigned telecommuting virtual numbers to place outbound calls to their centrally located colleagues. The present invention enables the calling party identification (ID) that is visually displayed when a remote worker places an outbound call to centrally located colleagues to appear with the same NPA and NXX as those of the centrally located employees. When a centrally located colleague calls a remote worker, the centrally located colleague dials the telecommuting virtual number of the remote worker as if dialing another number within the company location. This preserves the transparency of the locations of the remote workers.

A telecommuting virtual number is a phone number that is associated with one or more other endpoint phone numbers to which incoming calls are forwarded to and a phone number that can be used to access a VoIP network to make outgoing calls. When an incoming call is made to a virtual number from another call party, the incoming call will be forwarded to the registered list of one or more other endpoint phone numbers instead. When a telecommuting virtual number is used to make an outgoing call by a subscriber, the outgoing virtual number is also the point of origination for these outgoing calls. The users first dial their outgoing virtual number to access a VoIP network and then dial the desired destination phone number using the outgoing virtual number as the point of origination.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
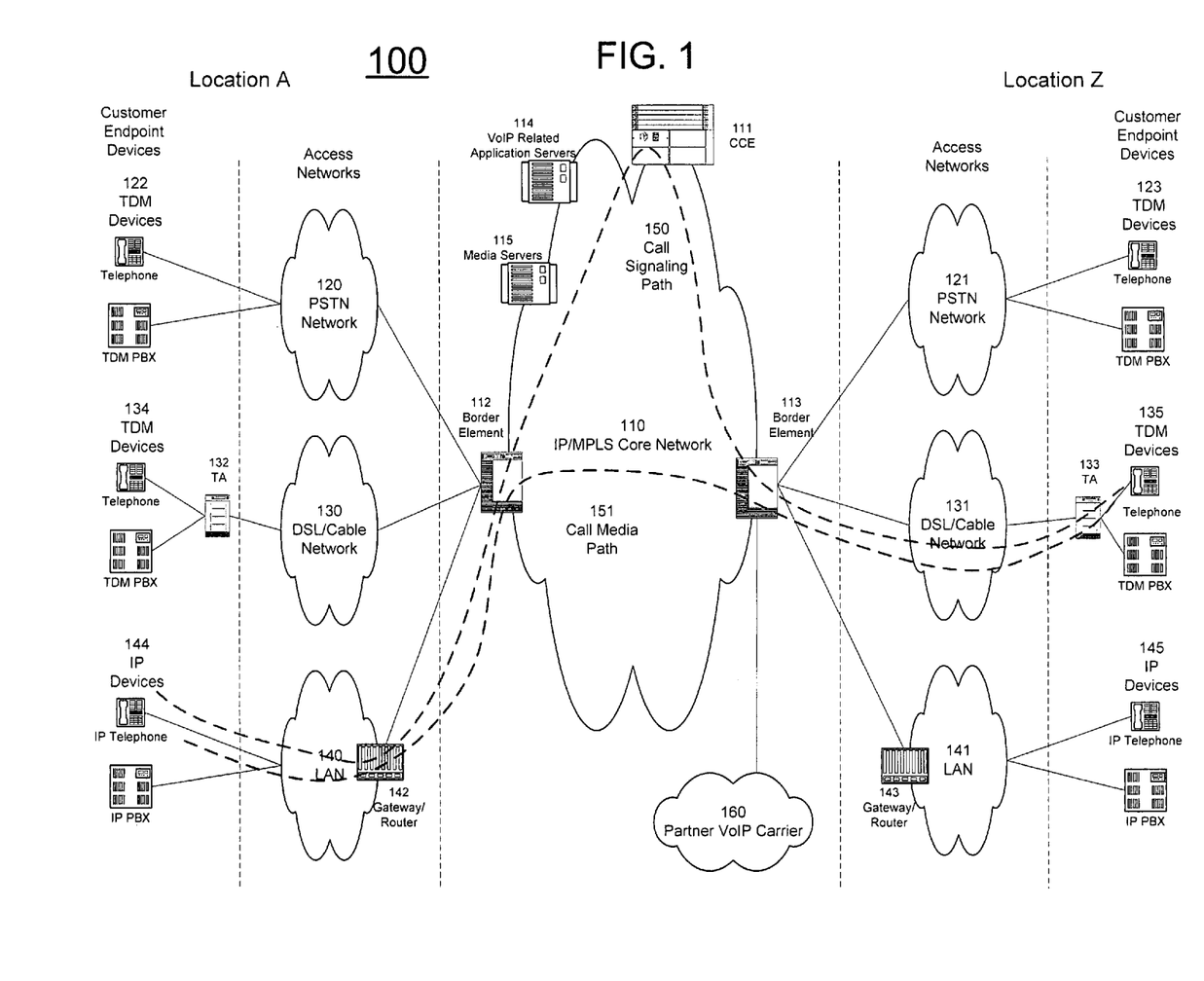
FIG. 1 illustrates an exemplary Voice over Internet Protocol (VoIP) network related to the present invention.

To better understand the present invention, FIG. 1 illustrates an example network 100, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Enterprises support an increasing number of telecommuters who work from home or other remote locations. A telecommuter is an employee who works remotely from the centrally located work location using voice and data connectivity to access centrally located resources of the company. Enterprises desire these workers to remain connected to the more centrally located work forces they employ and the actual locations where these telecommuters work from to be relatively transparent. Calls to and from these remote workers at remote locations can often interfere with this transparency since they are typically outside of the immediate local calling area of the enterprise.

For instance, when a remote worker working at home calls a colleague at the headquarter, the calling party identification (ID) will show the remote worker's home phone number which typically does not have the same NPA and NXX as those of the headquarter. On the other hand, when an employee from the headquarter calls a remote worker working at the home phone number, the call is typically made to a location outside of the local calling area of the headquarter location. In addition, the call will typically be a long distance call from a billing and cost perspective. An NPA (Numbering Plan Area) is the area code, the most significant 3 digits, of the 10 digit North American Numbering Plan (NANP) phone number. An NXX is used to indicate the second group of three digits, after the 3 digit area code, in a 10-digit NANP telephone number. The NXX is also known as the exchange code. Technically NXX is a short hand way of indicating a pattern of 3 digits: N means any number 2-9, and X means any number 0-9.

To address this need, the present invention provides enterprises the ability to provide telecommuting virtual number to these remote workers that are consistent with the NPA and the NXX of the dialing plans used internally at their headquarter location. For example, if the enterprise has an NPA of 212 and an NXX of 555, then the enterprise can provide a virtual number to each of the remote workers with the same NPA and NXX. This telecommuting virtual number is routed through a packet network, e.g., a VoIP network allowing calls placed to and from these workers to be treated as local calls. The remote workers will call their assigned telecommuting virtual numbers to place outbound calls to their centrally located colleagues. The present invention enables the calling party identification (ID) that is visually displayed when a remote worker places an outbound call to centrally located colleagues to appear with the same NPA and NXX as those of the centrally located employees. When a centrally located colleague calls a remote worker, the centrally located colleague dials the telecommuting virtual number of the remote worker as if dialing another number within the company location. This preserves the transparency of the locations of the remote workers.

A telecommuting virtual number is a phone number that is associated with one or more other endpoint phone numbers to which incoming calls are forwarded to and a phone number that can be used to access a VoIP network to make outgoing calls. When an incoming call is made to a virtual number from another call party, the incoming call will be forwarded to the registered list of one or more other endpoint phone numbers instead. When a telecommuting virtual number is used to make an outgoing call by a subscriber, the outgoing virtual number is also the point of origination for these outgoing calls. The users first dial their outgoing virtual number to access a VoIP network and then dial the desired destination phone number using the outgoing virtual number as the point of origination.

Figure 2:
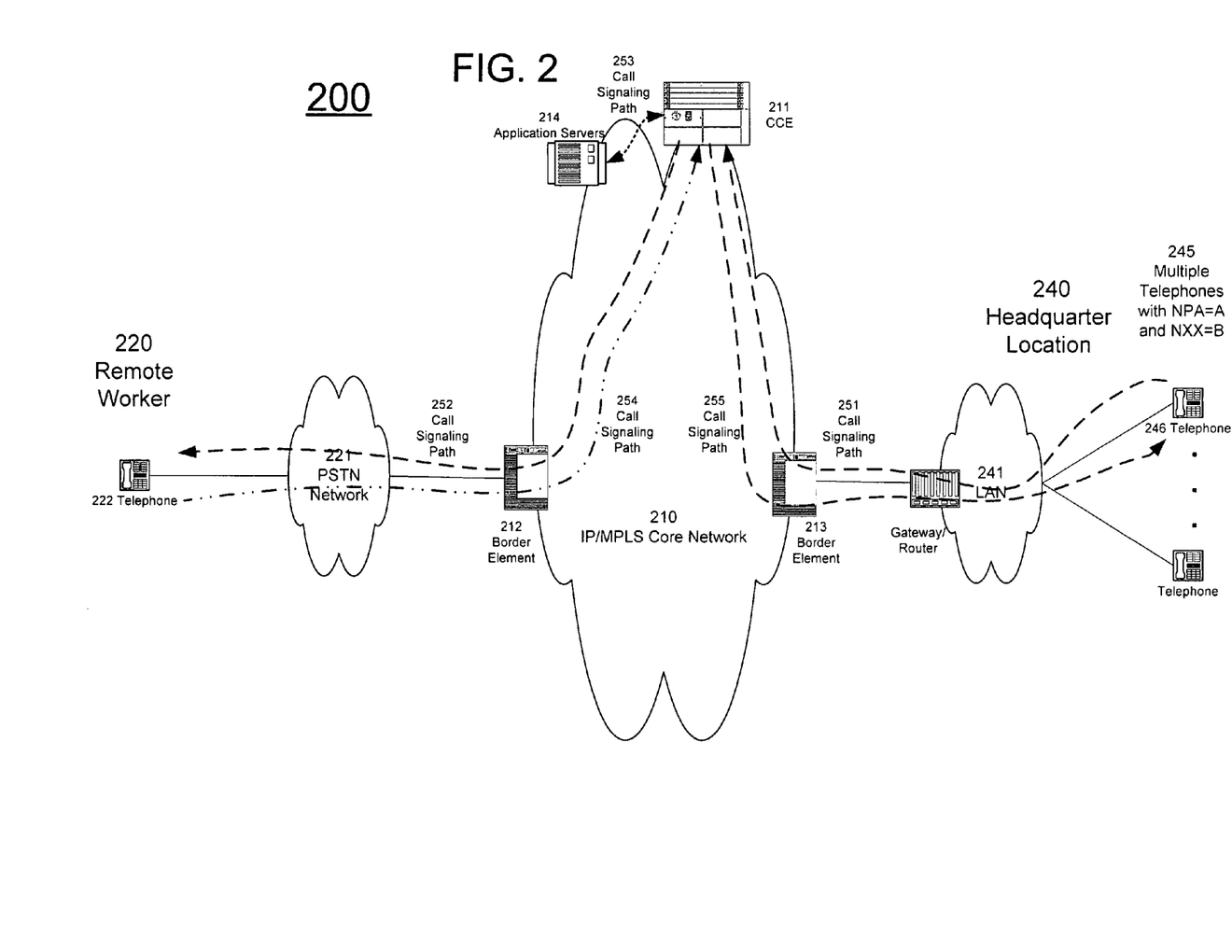
FIG. 2 illustrates an example of enabling telecommuting virtual numbers for remote workers in a VoIP network related to the present invention.

FIG. 2 illustrates an exemplary communication architecture 200 for providing telecommuting virtual numbers for remote workers in a packet network, e.g., a VoIP network related to the present invention. In FIG. 2, the central location of an enterprise is a headquarter location 240. The enterprise is also assigned an NPA=A and NXX=B for all phone extensions at this central location. The enterprise wants to keep the locations of all remote workers, e.g., telecommuters, where they work from to be transparent; therefore, the enterprise subscribes to a block of telecommuting virtual numbers from a VoIP provider with the same NPA and NXX as that of the main location. Remote worker 220 works from home using telephone 222. Remote worker 220 is assigned a telecommuting virtual number with the same NPA and NXX as that of the central location of the company. Telephone 222 has a phone number that has a different NPA and NXX from that of the telecommuting virtual number of the central location of the company.

For work purposes, remote worker 220 places outgoing calls using the assigned telecommuting virtual number. For instance, if remote worker 220 needs to call a centrally located colleague at the headquarter location 240, remote worker 220 then uses telephone 222 to dial into the assigned virtual number using signaling flow 254 via access network 221 and BE 212. Remote worker 220 registers the phone number of telephone 220 as the authorized endpoint to make an outgoing call. Upon receiving the call setup message associated with this outgoing call from the registered telephony endpoint, CCE 211 communicates with AS 214, using signaling flow 253, to verify the telecommuting virtual number subscription of remote worker 220. Once the subscription is verified, remote worker 220 is then prompted to enter the desired destination number, in this case the phone number of telephone 246 at headquarter location 240. After receiving the desired destination phone number from remote worker 220, CCE 211 then sends a call setup message to telephone 246 using the assigned telecommuting virtual number of remote worker 220 as the point of origination. CCE 211 uses signaling path 255 via BE 213 and access network 241 to send the call setup message to telephone 246. From the billing and cost perspective, the call originated from the telecommuting virtual number to headquarter location 240 is a local call since it originates and terminates within the same NPA and NXX. When the employee at headquarter location 240 using telephone 246 to answer the call, the caller ID will show the phone number of the assigned telecommuting virtual number consistent with the same NPA and NXX as that of headquarter location 240.

In another scenario, an employee from headquarter location 240 wants to make a call to remote worker 220. The centrally located employee uses telephone 246 to call remote worker 220 and dials the telecommuting virtual number assigned to remote worker 220 using signaling flow 251. Upon receiving the call setup message associated with this incoming call, CCE 211 communicates with AS 214, using signaling flow 253, to verify the telecommuting virtual number subscription of remote worker 220. Once the subscription is verified, CCE 211 retrieves the endpoint phone number that is associated with the telecommuting virtual number. In this case, the phone number of telephone 222 at the home of remote worker 220 is associated with the assigned telecommuting virtual number. CCE 211 then sends a call setup message to telephone 222 to complete the call. CCE 211 uses signaling path 252 to send the call setup message to telephone 222. From the billing and cost perspective, the call originated from headquarter location 240 to the telecommuting virtual number is a local call since it originates and terminates within the same NPA and NXX.

Figure 3:
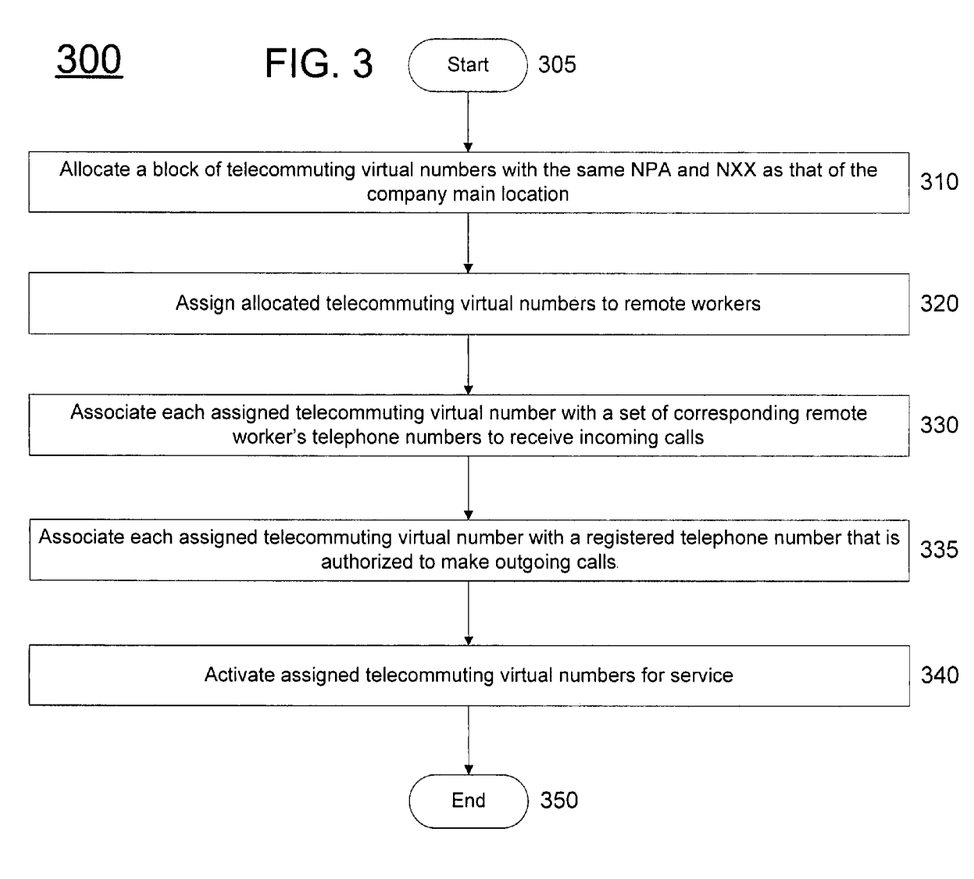
FIG. 3 illustrates a flowchart of a method for enabling telecommuting virtual numbers for remote workers in a VoIP network of the present invention.

FIG. 3 illustrates a flowchart of a method 300 for enabling telecommuting virtual numbers for remote workers in a packet network, e.g., a VoIP network of the present invention. Method 300 starts in step 305 and proceeds to step 310.

In step 310, the method allocates a block of telecommuting virtual numbers that have the same NPA and NXX as that of the central location of an enterprise. These telecommuting virtual numbers can be given to remote workers of an enterprise.

In step 320, the method assigns a different individual telecommuting virtual number to each of the remote workers.

In step 330, the method associates each telecommuting virtual number with one or more endpoint phone numbers of each remote worker to receive incoming calls. Namely, each virtual number can be associated with a home number, a cellular phone number and/or an another office number of the remote worker for the purpose of receiving an incoming call.

In step 335, the method associates each telecommuting virtual number with at least one corresponding registered telephone number that is authorized to make outgoing calls. Namely, each virtual number can be associated with a home number, a cellular phone number and/or an another office number of the remote worker for the purpose of authorizing an outgoing call.

In step 340, the method activates the assigned telecommuting virtual numbers for service. The method ends in step 350.

Figure 4:
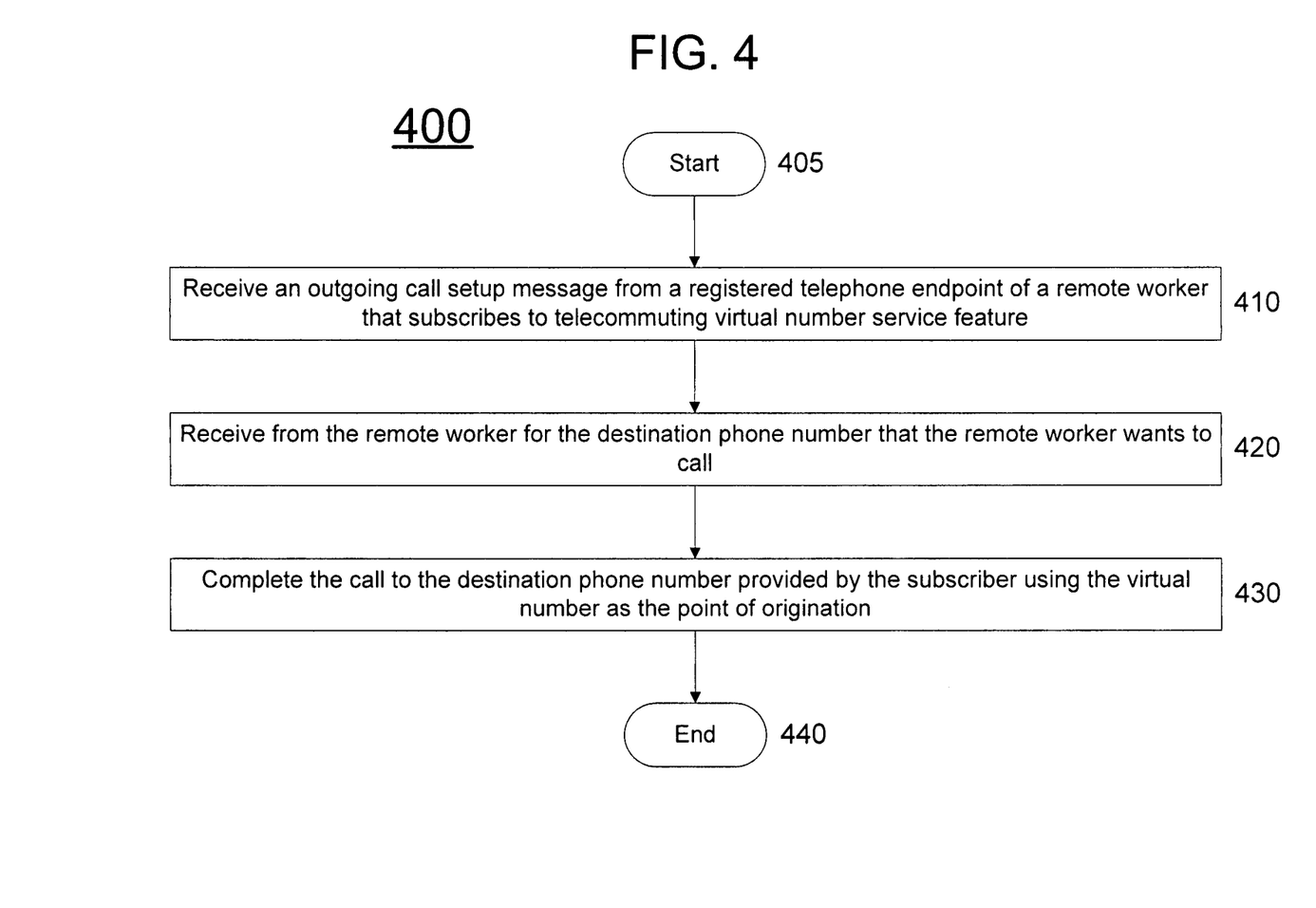
FIG. 4 illustrates a flowchart of a method for enabling remote workers to make outgoing calls using telecommuting virtual numbers in a VoIP network of the present invention.

FIG. 4 illustrates a flowchart of a method 400 for enabling remote workers to make outgoing calls using telecommuting virtual numbers in a packet network, e.g., a VoIP network of the present invention. Method 400 starts in step 405 and proceeds to step 410.

In step 410, the method receives an outgoing call setup message from a registered telephone number of a remote worker that subscribes to the telecommuting virtual number service feature to make outgoing calls. Namely, the remote worker dials the virtual phone number. The outgoing call is from the perspective that the remote worker is attempting to make an outgoing call from a remote location.

In step 420, the method prompts the remote worker to enter the destination phone number to call and receives the desired destination phone number from the remote worker.

In step 430, the method completes the call to the desired destination phone number using the assigned telecommuting virtual number as the point of origination. For instance, when the called party receives the call, the caller ID will display the assigned telecommuting virtual number as the calling party phone number instead of the phone number from which the remote worker actually calls from, e.g., such as the home phone number of the calling party. The method ends in step 440.

Figure 5:
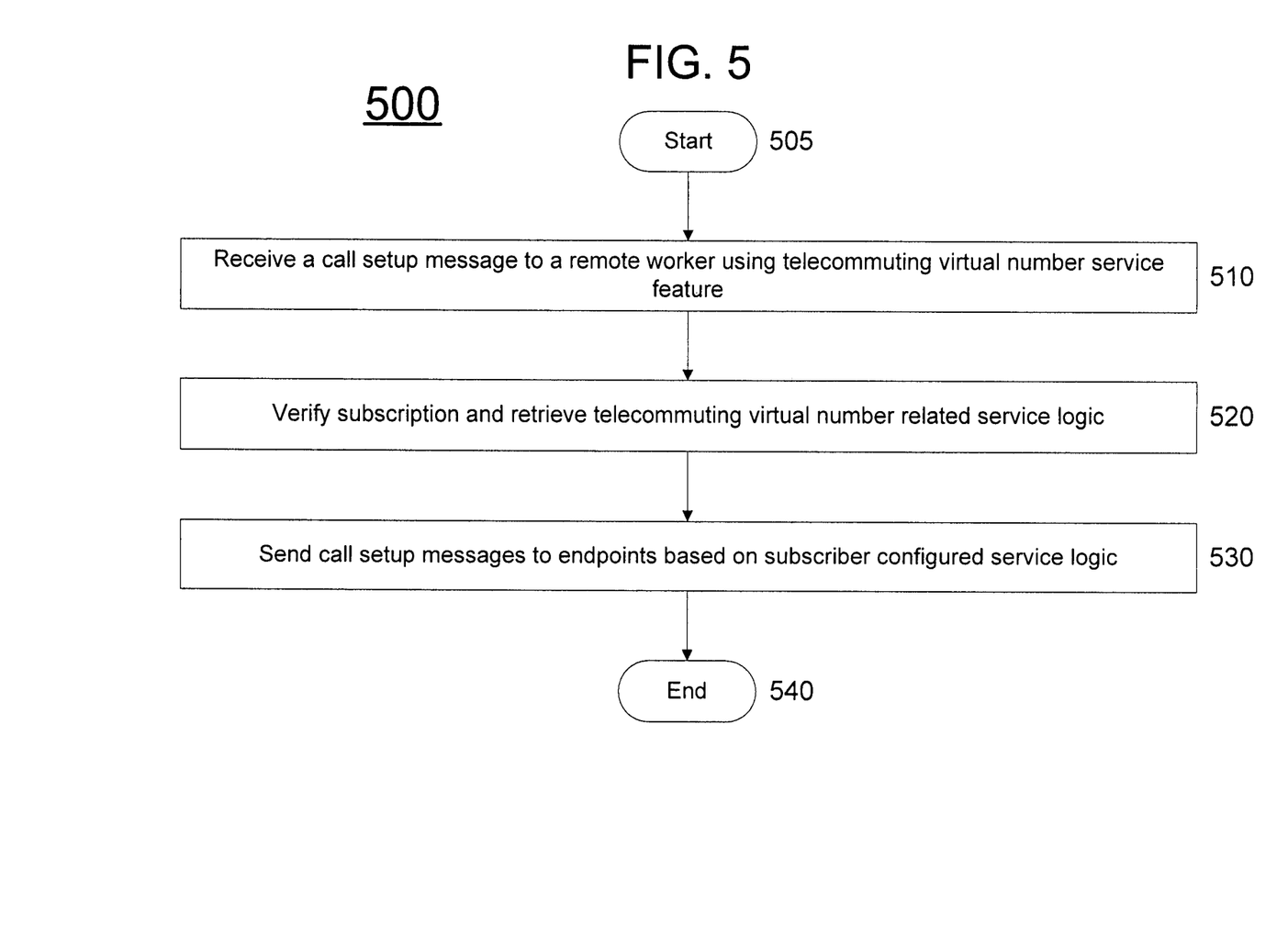
FIG. 5 illustrates a flowchart of a method for enabling remote workers to receive incoming calls using telecommuting virtual numbers in a VoIP network of the present invention.

FIG. 5 illustrates a flowchart of a method 500 for enabling remote workers to receive incoming calls using telecommuting virtual numbers in a packet network, e.g., a VoIP network of the present invention. Method 500 starts in step 505 and proceeds to step 510.

In step 510, the method receives an incoming call setup message destined to a telecommuting virtual number of a remote worker. The incoming call is from the perspective that the remote worker is receiving an incoming call at a remote location through the telecommuting virtual number.

In step 520, the method verifies the subscription of the telecommuting virtual number service. Once verified, the method retrieves the service logic associated with the telecommuting virtual number, such as the remote endpoint phone number to which that the call should be forwarded to reach the remote worker. For instance, service logic may include, but not limited to, calling a list of registered endpoint phone numbers in serial (e.g., calling one phone number at a time on the list) or in parallel (simultaneously calling all the phone numbers on the list), or calling different subsets of the list of registered endpoint phone numbers based on time of date and day of week arrangement.

In step 530, the method sends the call message to the remote endpoint phone number to complete the call. The method ends in step 540.

Figure 6:
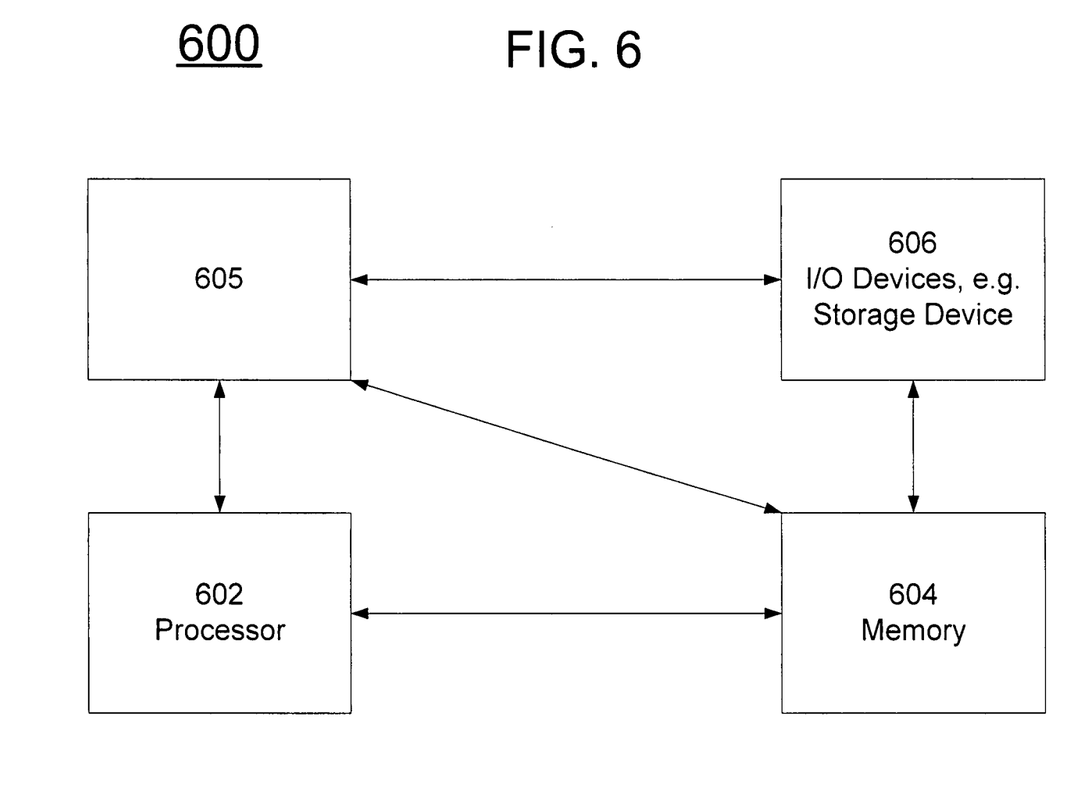
FIG. 6 illustrates a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), a module 605 for providing telecommuting virtual numbers for remote workers, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 605 for providing telecommuting virtual numbers for remote workers can be loaded into memory 604 and executed by processor 602 to implement the functions as discussed above. As such, the present process 605 for providing telecommuting virtual numbers for remote workers (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a telecommuting virtual number in a communication network, comprising:
   receiving, by a call control element deployed in the communication network, an incoming call from an endpoint device of a remote worker in accordance with a telecommuting virtual number for use in initiating an outgoing call to a location of an enterprise that employs the remote worker, wherein the telecommuting virtual number is assigned to the remote worker where the telecommuting virtual number is considered to be a local phone number when compared to a location of the enterprise, wherein the outgoing call is treated as a local call for billing, wherein the communication network is a service provider internet protocol network, wherein the call control element comprises a media gateway controller, and wherein the receiving further comprises:
      verifying the incoming call to the telecommuting virtual number as an outgoing call request from a telephony endpoint phone number registered by the remote worker; and
      prompting the remote worker to enter a desired destination phone number; and
   connecting, by the call control element, the outgoing call to the desired destination phone number using the telecommuting virtual number as a point of origination.

2. A non-transitory computer-readable medium storing a plurality of instructions which, when executed by a processor of a call control element deployed in a communication network, cause the processor to perform operations for providing a telecommuting virtual number in the communication network, the operations comprising:
   receiving, by the call control element, an incoming call from an endpoint device of a remote worker in accordance with a telecommuting virtual number for use in initiating an outgoing call to a location of an enterprise that employs the remote worker, wherein the telecommuting virtual number is assigned to the remote worker where the telecommuting virtual number is considered to be a local phone number when compared to a location of the enterprise, wherein the outgoing call is treated as a local call for billing, wherein the communication network is a service provider internet protocol network, wherein the call control element comprises a media gateway controller, and wherein the receiving further comprises:
      verifying the incoming call to the telecommuting virtual number as an outgoing call request from a telephony endpoint phone number registered by the remote worker; and
      prompting the remote worker to enter a desired destination phone number; and
   connecting, by the call control element, the outgoing call to the desired destination phone number using the telecommuting virtual number as a point of origination.

3. An apparatus for providing a telecommuting virtual number in a communication network, comprising:
   a processor deployed in the communication network; and a computer-readable medium storing a plurality of instructions which, when executed by the processor, cause the processor to perform operations, the operations comprising:

receiving an incoming call from an endpoint device of a remote worker in accordance with a telecommuting virtual number for use in initiating an outgoing call to a location of an enterprise that employs the remote worker, wherein the telecommuting virtual number is assigned to the remote worker where the telecommuting virtual number is considered to be a local phone number when compared to the location of the enterprise, wherein the outgoing call is treated as a local call for billing, wherein the communication network is a service provider internet protocol network, wherein the processor comprises a processor of a call control element, wherein the call control element comprises a media gateway controller, and wherein the receiving further comprises:

verifying the incoming call to the telecommuting virtual number as an outgoing call request from a telephony endpoint phone number registered by the remote worker; and         prompting the remote worker to enter a desired destination phone number; and     connecting the outgoing call to the desired destination phone number using the telecommuting virtual number as a point of origination.

* * * * *